(12) United States Patent
Fukuyama et al.

(10) Patent No.: US 6,823,695 B2
(45) Date of Patent: Nov. 30, 2004

(54) PRESS-FORMING SYSTEM FOR GLASS

(75) Inventors: Satoshi Fukuyama, Numazu (JP); Hiroaki Fujii, Anjo (JP); Isao Matsuzuki, Numazu (JP); Hirotaka Masaki, Mishima (JP)

(73) Assignee: Toshiba Machine Co., Ltd., Tokyo (JP)

( * ) Notice: Subject to any disclaimer, the term of this patent is extended or adjusted under 35 U.S.C. 154(b) by 306 days.

(21) Appl. No.: 10/103,144

(22) Filed: Mar. 22, 2002

(65) Prior Publication Data
US 2002/0139146 A1 Oct. 3, 2002

(30) Foreign Application Priority Data
Mar. 30, 2001 (JP) ........................................ 2001-101583

(51) Int. Cl.[7] .............................................. C03B 23/00
(52) U.S. Cl. ............................ 65/246; 65/102; 65/260; 65/268; 65/286; 65/306; 264/1.1; 264/2.5; 264/2.7; 425/808
(58) Field of Search ............................ 65/102, 106, 111, 65/158, 163, 226, 229, 243, 246–251, 260, 268, 275, 286, 305, 306; 100/193, 207, 155 G; 264/1.1, 1.24, 2.1, 2.4, 2.5, 2.7; 425/808, 126.1, 341, 397, 38; 414/222.01

(56) References Cited

U.S. PATENT DOCUMENTS

| | | | | |
|---|---|---|---|---|
| 5,269,978 A | * | 12/1993 | Umetsu et al. | 264/1.36 |
| 5,344,476 A | * | 9/1994 | Tomida | 65/102 |
| 5,403,370 A | * | 4/1995 | Morikita | 65/286 |
| 5,417,730 A | * | 5/1995 | Shigyo et al. | 65/111 |
| 5,616,161 A | * | 4/1997 | Morikita | 65/157 |
| 5,895,192 A | * | 4/1999 | Parnell et al. | 414/225.01 |
| 6,176,669 B1 | * | 1/2001 | Lust et al. | 414/226.01 |
| 6,305,729 B1 | * | 10/2001 | Mukasa | 294/64.1 |
| 6,439,870 B1 | * | 8/2002 | Marceau et al. | 425/111 |

FOREIGN PATENT DOCUMENTS

TW  290529  11/1996

OTHER PUBLICATIONS

Office Action, dated May 20, 2004, from the Taiwan Patent Office for Patent Application No. 91105645.

* cited by examiner

Primary Examiner—Steven P. Griffin
Assistant Examiner—Eric Hug
(74) Attorney, Agent, or Firm—Pillsbury Winthrop LLP

(57) ABSTRACT

An object of the present invention is to enable to use a common transfer machine for transferring performs to and for transferring products from a press-forming system for glass having a plurality of press units. The press-forming system for glass has a plurality of press units. A linear moving stage is arranged in the proximity of the press units. A transfer robot is mounted on the linear moving stage. A pallet changer is arranged in the proximity of an end of the linear moving stage. A tray presently in use is mounted on a first mount and a new tray on standby is mounted on a second mount on the pallet changer. The inner space of the tray is partitioned into sections so as to correspond to press units in number. In each section, a plurality of pockets is arranged for storing preforms or products one by one.

2 Claims, 2 Drawing Sheets

FIG. 3

| Section-11 | O × ×<br>× × ×<br>× × × | O | Press unit-1 |
| --- | --- | --- | --- |
| Section-12 | O × ×<br>× × ×<br>× × × | O | Press unit-2 |
| Section-13 | O × ×<br>× × ×<br>× × × | O | Press unit-3 |
| Section-14 | O × ×<br>× × ×<br>× × × | O | Press unit-4 |

FIG. 4

| Section-11 | ● O ×<br>× × ×<br>× × × | O<br>× | Press unit-1 |
| --- | --- | --- | --- |
| Section-12 | ● O ×<br>× × ×<br>× × × | O<br>× | Press unit-2 |
| Section-13 | ● O ×<br>× × ×<br>× × × | O<br>× | Press unit-3 |
| Section-14 | ● O ×<br>× × ×<br>× × × | O<br>× | Press unit-4 |

FIG. 5

| Section-11 | ● ● ●<br>● ● ●<br>● O ● | O<br>● | Press unit-1 |
| --- | --- | --- | --- |
| Section-12 | ● ● ●<br>● ● ●<br>O O O | × | Press unit-2 |
| Section-13 | ● ● ●<br>● ● O<br>O O × | × | Press unit-3 |
| Section-14 | ● ● ●<br>O O O<br>× × × | × | Press unit-4 |

PRESS-FORMING SYSTEM FOR GLASS

CROSS-REFERENCE TO RELATED APPLICATIONS

This application is based upon and claims the benefit of priority from the prior Japanese Patent Application No. 2001-101583, filed Mar. 30, 2001, the entire contents of which are incorporated herein by reference.

BACKGROUND OF THE INVENTION

1. Field of the Invention

The present invention relates to a press-forming system manufacturing glass into a product such as an optical lens. More particularly, the present invention relates to a machine supplying raw materials and collecting formed products produced in the press-forming system having a plurality of press units, and also relates to a method of using the machine.

2. Description of the Related Art

An optical element made of glass such as an optical lens is usually manufactured by grinding and polishing and sometimes manufactured by press-forming. In a press-forming system, a glass material (called a preform) is set between a pair of dies, heated up to a glass transition temperature or more, and pressed by the pair of dies. It follows that patterns of the dies are transferred to the preform, thereby obtaining a formed product.

Since a relatively long process (including setting of a preform, heating, press-forming, cooling, and die opening, collecting a formed product) is required for forming glass into a product by a conventional press-forming system for glass, a plurality of press units is often arranged in parallel to improve the productivity. In such a conventional system, a transfer machine is usually arranged in each press unit to supply a preform to a press unit and collect a formed product from the press unit. However, not only the cost of equipment but also the footprint of the entire system is increased by providing a transfer machine in each press unit.

BRIEF SUMMARY OF THE INVENTION

The present invention has been attained in view of the aforementioned problems associated with conventional press-forming system for glass. An object of the present invention is to enable to use a common transfer machine for transferring performs to and for transferring products from a press-forming system having a plurality of press units.

According to the present invention, there is provided a press-forming system for glass comprising:

a plurality of press units a tray storing preforms to be supplied to the press units and products formed by the press units; and a single transfer robot transferring preforms from the tray to each of the press units and transferring formed products from each of the press units to the tray, one by one.

According to the press-forming system for glass, since a common transfer machine is used for transferring preforms to a plurality of press units and transferring formed products from the press units one by one, the manufacturing cost and the footprint of the entire system can be minimized.

The inner space of the tray is preferably partitioned into a plurality of sections corresponding to the press units in number. Each section houses a plurality of pockets each being used for storing a preform or a formed product.

According to the present invention, the inner space of the tray is partitioned into a plurality of sections, which are assigned respectively to the press units. Therefore, in the case where the types of product to be formed in the press units differ from each other, it is easy to store preforms and products in different sections corresponding to the press units.

In addition, it is easy to inspect the different types of products as they were placed on the tray. Furthermore, a possibility that preforms and formed products are mistakenly placed in the same tray can be reduced.

In the press-forming system for glass, the trays are preferably replaced in accordance with the following procedure. A new tray is prepared by sequentially loading a requisite number of preforms in pockets of each section except the initial pocket to initially be used. Thereafter, when all preforms stored in any one of sections of the tray presently in use are used up, the tray is replaced with the new tray.

This feature is advantageous in the following point. When a formed product is obtained for the first time after the old tray is replaced with the new tray, the formed product is taken out from a press unit and loaded in the initial pocket of the section corresponding to the press unit, and then, another preform is picked up from the second pocket of the same section and successfully set at the corresponding press unit. Thereafter, when a formed product is obtained in another press unit, the formed product is picked up and loaded in a vacant pocket in the section of the tray corresponding to the press unit.

By virtue of this feature, even if an accident occurs in any one of the press units, preventing formed products from reaching a predetermined number per press unit, it is possible to minimize its effect upon the productivity of other press unit.

BRIEF DESCRIPTION OF THE SEVERAL VIEWS OF THE DRAWING

FIG. 3 is a view of the inner space of a new tray containing a fresh set of preforms to be used in the press-forming system for glass of the present invention;

FIG. 4 is a view of the inner space of the tray presently in use in the press-forming system for glass of the present invention; and FIG. 5 is a view of the inner space of the tray immediately before being replaced with a new tray in the press-forming system of the present invention.

DETAILED DESCRIPTION OF THE INVENTION

Figure 1:
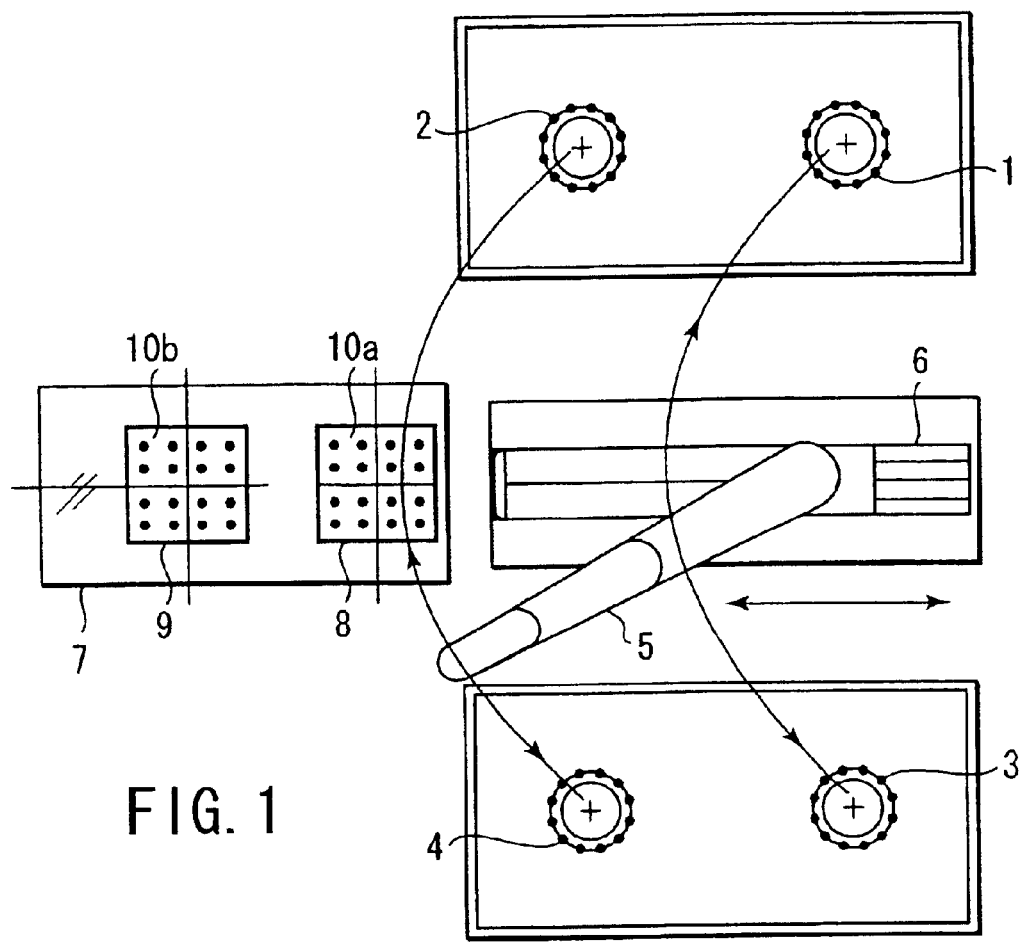
FIG. 1 is a schematic structure of a press-forming system for glass according to the present invention.

FIG. 1 shows a schematic structure of a press-forming system for glass according to the present invention. The press-forming system for glass comprises press units 1 to 4, a transfer robot 5, a linear moving stage 6 for a robot, a pallet changer 7, and trays 10*a* and 10*b*.

In this example, a main body of the press-forming system for glass is constituted of the press units 1 to 4. Two press units are mounted in each of two bases, which are arranged in parallel. Between the two bases, the transfer robot 5 is arranged. The transfer robot 5 has a rotatory arm. The tip portion of the rotatory arm is equipped with a vacuum chuck for holding a preform or a formed product. The transfer robot 5 is mounted on the linear moving stage 6 and moves along the bases.

The pallet changer 7 is arranged in the proximity of an end (the left end, in the figure) of the linear moving stage 6. Two mounts are arranged on the pallet changer 7 for mounting trays thereon. The tray 10*a* presently in use is mounted on the first mount and the tray 10*b* on standby is mounted on the second mount.

Figure 2:
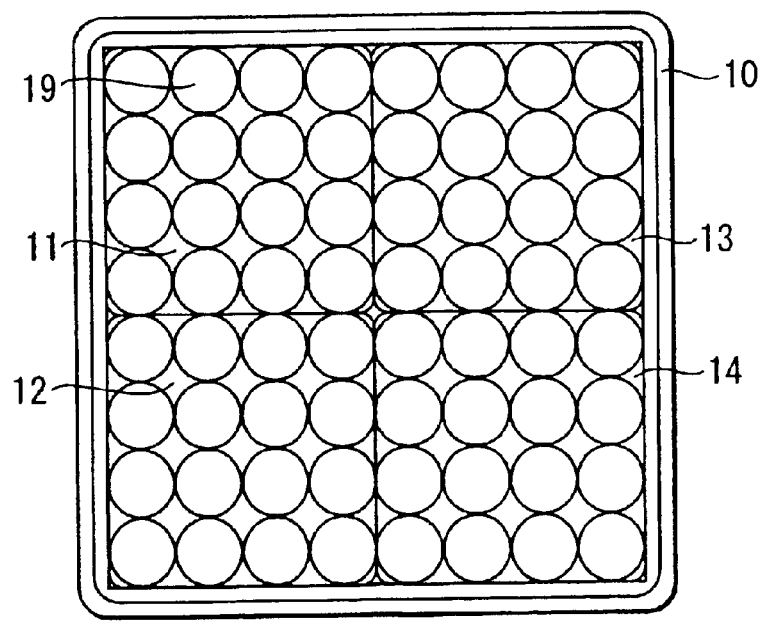
FIG. 2 is a top view of a tray of the press-forming system for glass of the present invention for storing preforms and products.

FIG. 2 shows a top view of a tray 10. The inner space of the tray 10 is partitioned into sections corresponding in number to the press units constituting the press-forming system for glass. More specifically, the inner space of the tray 10 is partitioned into 4 sections 11 to 14 so as to correspond to press units 1 to 4, respectively.

The section 11 to 14 each houses a plurality of pockets 19 for storing preforms or formed products. In this example, each section has 16 pockets.

The press units 1 to 4 can be independently operated. In other words, the operational cycles of press units need not be synchronized. This means that different types of formed products can be obtained in the different press units. Furthermore, it is not necessary to use all of the press units.

Now, the operation of a tray of the press-forming system for glass will be explained more specifically.

In FIG. 1, a transfer robot 5 takes out a preform from a pocket 19 of any one of the sections 11 to 14 of the tray 10*a* mounted on the first mount 8 and transferred to the press units (any one of 1 to 4) corresponding to the section. After a formed product is obtained, the transfer robot 5 takes out the formed product from any one of the press units 1 to 4 and loads it in a vacant pocket 19 of the section (any one of 11 to 14) corresponding to the press unit.

When all preforms stored in any one of the sections of the tray 10*a* presently in use are used up, the tray 10*a* is replaced with a new tray 10*b*. That is, the tray 10*a* is removed from the first mount 8 and the tray 10*b* mounted on the second mount 9 is transferred to the first mount 8.

At this time, if preforms are left in other sections of the tray 10*a*, they are transferred to the pockets of the corresponding section of a tray to be newly mounted on the second mount 9.

Now, the operation to be performed in each section of the tray will be explained. In this example, each section of the tray has 9 pockets.

FIGS. 3 to 5 show the state of pockets in each section and the state of press units. In the figures, symbol "603" represents "vacant", symbol "X" represents "a preform is stored", and symbol "574" represents "a product is stored".

FIG. 3 shows the state of a new tray 10*a* containing a complete set of preforms immediately after it is fitted to the first mount 8. As shown in the figure, all pockets of each section except the initial pocket (pocket to initially be used) are filled with preforms. In short, 8 preforms are stored in each section.

For example, assuming that a formed product is obtained in the press unit 1 after a tray is exchanged, the transfer robot 5 takes out the formed product from the press unit 1 and transfers it to the initial pocket of the section 11 corresponding to the press unit 1, as shown in FIG. 4. Subsequently, the robot takes out a preform from the second pocket of the section 11 and transfers it to the press unit 1. Thereafter, assuming that a formed product is obtained in the press unit 3, the transfer robot 5 takes out the formed product from the press unit 3 and transfers it to the initial pocket of the section 13 of the tray corresponding to the press unit 3 and thereafter takes out a preform from the next pocket (second pocket) of the section 13 and transfers it to the press unit 3. Furthermore, assuming that a formed product is obtained in the press unit 1, the transfer robot 5 takes out the formed product from the press unit 1 and transfers it to the second pocket of the section 11 corresponding to the press unit 1 and thereafter takes out a preform from a third pocket of the section 11 and transfers it to the press unit 2.

In the manner mentioned above, no matter when a formed product is obtained in a press unit, the formed product is taken out from the press unit and transferred to a vacant pocket in the section of the tray corresponding to the press unit.

FIG. 5 shows a state of the tray 10*a* when it is to be removed from the first mount 8 and replaced with a new tray. The tray 10*a* is replaced with a new tray when all preforms stored in any one of the sections of the tray are used up.

Now, assuming that, after the new tray is mounted, the preforms stored in the section 11 are first used up. When a formed product is obtained in the press unit 1, the formed product is taken out from the press unit 1 and transferred to the last-but-one pocket of the section 11 and then a preform is taken out from the last pocket. Thereafter, the tray is replaced with a new tray. That is, the tray presently in use is removed from the first mount 8 and the tray on standby mounted on the second mount 9 is transferred onto the first mount 8.

According to the press-forming system for glass, a common transfer machine is used for transferring a preform to a plurality of press units and transferring a formed product from the press units. It is therefore possible to reduce the manufacturing cost and the footprint of the entire system. Furthermore, the number of press units can be increased in a relatively simple manner.

Furthermore, the inner space of the tray is partitioned into a plurality of sections, which are assigned respectively to the press units. Therefore, in the case where the types of product to be formed in the press units differ from each other, it is easy to store preforms and products in different sections corresponding to the press units.

In addition, it is easy to inspect the different types of products as they were placed on the tray. Furthermore, the possibility that preforms and formed products are mistakenly placed in the same tray can be reduced.

Since the inner space of the tray is partitioned in the aforementioned manner, even if an accident occurs in any one of the press units, preventing formed products from reaching a predetermined number per press unit, it is possible to minimize its effect upon the productivity of other press unit.

What is claimed is:

1. A press-forming system for glass, comprising:
    a plurality of press units;
    a tray storing preforms to be supplied to the press units and products formed by the press units; and
    a single transfer robot transferring preforms from the tray to each of the press units and transferring formed products from each of the press units to the tray,
    wherein an inner space of said tray is partitioned into a plurality of sections corresponding to the number of said press units, and each of said sections having a plurality of pockets each storing a preform or a product.

2. A method of exchanging a tray storing a preform and/or a product in a press-forming system for glass, comprising:

a plurality of press units;

a tray storing preforms to be supplied to the press units and formed products by the press units, an inner space of said tray being partitioned into a plurality of sections corresponding to the number of said press units, and each of said sections having a plurality of pockets each storing a preform or a product; and a single transfer robot transferring a preform from the tray to each of the press units and a formed product from each of the press units to the tray, said method comprising:

storing a requisite number of preforms in pockets of each of the sections of a new tray except each initial pocket to initially be used; and replacing the tray presently in use with the new tray immediately after all preforms are taken out from any one of the sections of the tray presently in use.

* * * * *